United States Patent [19]
Nishimura et al.

[11] Patent Number: 5,296,278
[45] Date of Patent: Mar. 22, 1994

[54] GASTIGHT WOVEN FABRIC SHEET FOR AIR BAGS AND A PROCESS FOR PRODUCING SAME

[75] Inventors: Kunio Nishimura, Ibaraki; Hideo Nakagawa, Takatsuki; Nobuo Takahashi, Ikoma; Kiyoshi Maruo, Matsuyama, all of Japan

[73] Assignee: Teijin Limited, Osaka, Japan

[21] Appl. No.: 66,093

[22] Filed: Sep. 25, 1992

[86] PCT No.: PCT/JP92/01217
§ 371 Date: May 27, 1993
§ 102(e) Date: May 27, 1993

[87] PCT Pub. No.: WO93/05985
PCT Pub. Date: Apr. 1, 1993

[30] Foreign Application Priority Data

Sep. 27, 1991 [JP] Japan .................. 3-275011
Jun. 29, 1992 [JP] Japan .................. 4-170812

[51] Int. Cl.$^5$ ............................................. B29D 22/00
[52] U.S. Cl. .................................... 428/36.1; 28/116; 28/122; 28/134; 28/135; 280/728; 428/225; 428/229; 428/252; 428/265; 428/266
[58] Field of Search .............. 428/225, 229, 265, 266, 428/252, 36.1; 28/116, 122, 134, 135; 280/728

[56] References Cited

U.S. PATENT DOCUMENTS

| | | | |
|---|---|---|---|
| 4,872,270 | 10/1989 | Godfrey | 428/225 |
| 4,921,735 | 5/1990 | Bloch | 428/34.9 |
| 4,977,016 | 12/1990 | Thornton et al. | 428/225 |
| 5,010,663 | 4/1991 | Thornton et al. | 428/225 |
| 5,073,418 | 12/1991 | Thornton et al. | 428/225 |
| 5,208,097 | 5/1993 | Honma et al. | 428/36.1 |
| 5,215,795 | 6/1993 | Matsumoto et al. | 428/36.1 |

FOREIGN PATENT DOCUMENTS

| | | |
|---|---|---|
| 59-192767 | 11/1984 | Japan . |
| 61-28046 | 2/1986 | Japan . |
| 61-146840 | 7/1986 | Japan . |
| 1-122752 | 5/1989 | Japan . |

Primary Examiner—James J. Bell
Attorney, Agent, or Firm—Burgess, Ryan & Wayne

[57] ABSTRACT

A gastight woven fabric sheet for air bags having no risk of burning a person due to formation of gas-permeable perforations and gas flowing out when the air bag is inflated, a high burst strength due to a reinforcing effect by adhesion, and a satisfactory feel, comprising a woven fabric composed of a plurality of warps and wefts each comprising a polyester multifilament having a yarn thickness of 200 to 550 deniers and a twist multiplier of 3,000 or less, and having a smooth surface formed by a calendering and a non-smoothed opposite surface thereof, the woven fabric having a gas-permeability function (ml/cm$^2$/sec) of 7.874 p to 78.74 p (wherein p is a pressure between 0 to 0.03 kg/cm$^2$G); a radius R1 (mm) of curvature of a smoothed surface side half portion of a cross-sectional profile of a warp or weft yarn located in the smoothed surface portion of the fabric, larger than a radius R2 (mm) of curvature of an opposite side half portion of a cross-sectional profile of the above-mentioned warp or weft yarn and than a radius R3 (mm) of curvature of a non-smoothed surface side half portion of a cross-sectional profile of a warp or weft yarn located in the non-smoothed surface portion of the woven fabric, which R3 is in the range of from 0.5 to 3.5; a difference in average deviation of 0.0005 or more between surface frictional coefficients of the smoothed surface and the non-smoothed surface of the woven fabric; a difference in average deviation of 0.5 μm or more between surface roughnesses of the above-mentioned surfaces; and a fiber packing of 70 to 85%.

17 Claims, 4 Drawing Sheets

5,296,278

GASTIGHT WOVEN FABRIC SHEET FOR AIR BAGS AND A PROCESS FOR PRODUCING SAME

TECHNICAL FIELD

The present invention relates to a gastight woven fabric sheet for air bags and a process for producing the same. More particularly, the present invention relates to a gastight woven fabric sheet for air bags, provided with only one smoothed surface thereof and having, though the other surface thereof is not smoothed, a very low gas-permeability and excellent functionality in protection of an occupant in automobile or aircraft in comparison with that of a conventional airtight woven fabric in which both surfaces thereof are smoothed, and a process for producing the same.

BACKGROUND ART

As a typical example of conventional airtight woven fabric sheets for air bags, U.S. Pat. No. 4,977,016 (Japanese Unexamined Patent Publication No. 4-2835) discloses a polyester woven fabric (which will be referred to as a noncoated woven fabric hereinafter) not coated with or not impregnated with a resin and having an air permeability of 0.5 ml/cm²/sec/0.5 inch Aq or less. Also, U.S. Pat. No. 5,010,663 (Japanese Unexamined Patent Publication No. 4-2835) discloses a noncoated polyester woven fabric with a permeability of 1.5 ml/cm²/sec/0.5 inch Aq or less.

Those polyester woven fabrics are both surface-smoothed woven fabrics produced by applying a calendering operation to both the surfaces thereof. Those woven fabrics obtained by the both surface-calendering operation have a high air-permeability in comparison with that of a resin-coated woven fabric. In examples of the patent specifications, the air permeability is higher than 0.1 ml/cm²/sec/0.5 inch Aq.

It has been known that when the above-mentioned conventional woven fabric sheets are practically employed to form an air bag, the above-mentioned value of air permeability causes easy formation of air-permeable perforations in the air bag, and thus the resultant air bag has such a fatal defect that an inflation gas flows out through the perforations and the face of an occupant in automobile or aircraft is burnt by the gas.

Specially, when a large amount of fine particles are generated upon inflating, or when the inflation is carried out using a powerful inflator, it is not too much to say that the above-mentioned noncoated woven fabric air bag has a serious defect. Since the calendering operation is applied to both the surfaces, the resultant woven fabric sheet is provided with both smoothed surfaces thereof and has a high stiffness and thus is disadvantageous in that the fabric is paper-like.

Since the polyester woven fabric has a lower burst strength at sewn portions thereof than that of nylon 66 woven fabric, it is necessary to enhance the burst strength of the sewn portions at, for example, portions surrounding the inflator and top cloth of the air bag, by applying an adhesive reinforcement which has a higher reinforcing effect than that of usual sewing, or by applying a sewing operation after the portions to be sewn are reinforced by the adhesive reinforcement to enhance the burst strength of the portions of the air bag. This is true not only for a beltless bag but also for a belt-attached bag. However, the above-mentioned both surface-calendered woven fabric has a poor bonding property due to the smooth surfaces thereof and thus it is very difficult to reinforce the woven fabric by laminate-adhering a reinforcing fabric, which may be the same as or different from the woven fabric, thereto.

U.S. Pat. No. 4,921,735 (Japanese Unexamined Patent Publication) discloses a woven fabric having an air permeability of 0 to 0.53 ml/cm²/sec/0.5 inch Aq and usable as a calendered airtight woven fabric for air bag. However, examples of the U.S. patent do not show any concrete values of the gas permeability. Also, the woven fabric of the U.S. patent has a warp density of 40.6 yarns/inch and a weft density of 86.4 yarns/inch. Since the warp density and the weft density are very different, the resultant woven fabric disadvantageously exhibits not only a significantly lower burst strength in one direction, but also a remarkably poor bonding strength in one direction. Further, as is same for the two afore-mentioned U.S. patents, U.S. Pat. No. 4,921,735 does not disclose a technical idea of smoothing only one surface of the woven fabric and a concept of improving a bonding property of the woven fabric.

Accordingly, an object of the present invention is to solve the above-mentioned problems of conventional non-resin-coated polyester woven fabric for air bags which remain unsolved, and to provide an airtight woven fabric sheet for air bags, having a low air permeability, a specific surface property which allows a surface of the fabric to be adhesive-reinforced, an enhanced burst strength, and an excellent feel, and capable of preventing the formation of gas-permeable perforations in the bag to prevent burns by the inflation gas flowing out through the perforations, and a process for producing the same.

DISCLOSURE OF THE INVENTION

The gastight woven fabric sheet for air bags of the present invention comprising a woven fabric formed from a plurality of warps and wefts each comprising a polyester multifilament yarn having a yarn thickness of 200 to 550 deniers and a twist multiplier of 3,000 or less, said woven fabric having a smoothed surface and an opposite non-smoothed surface thereof and satisfying all the relationships (1) to (7):

$$78.74p \geq Q(p) \geq 7.874p \tag{1}$$

$$R1 > R2 \tag{2}$$

$$R1 > R3 \tag{3}$$

$$3.5 \geq R3 \geq 0.5 \tag{4}$$

$$Mu - Mc \geq 0.0005 \tag{5}$$

$$Su - Sc \geq 0.5 \tag{6}$$

and $$85 \geq P \geq 70 \tag{7}$$

in which relationships (1) to (7), p represents a pressure in unit of kg/cm²G and satisfying the relationship:

$$0 \geq p \leq 0.03;$$

Q(p) represents a gas permeability function in units of ml/cm²/sec of the woven fabric under the pressure p;

R1 represents a radius of curvature in units of mm of a smoothed surface side half portion of a cross-sectional profile of at least one selected from the warp and weft yarns located in the smoothed surface portion of the woven fabric;

R2 represents a radius of curvature in units of mm of an opposite side half portion of the cross-sectional profile of at least one selected from the warp and weft yarns located in the smoothed surface portion of the woven fabric;

R3 represents a radius of curvature in units of mm of a non-smoothed surface side half portion of a cross-sectional profile of at least one selected from the warp and weft yarns located in the non-smoothed surface portion of the woven fabric;

Mc represents an average deviation in surface frictional coefficient of the smoothed surface of the woven fabric;

Mu represents an average deviation in surface frictional coefficient of the non-smoothed surface of the woven fabric;

Sc represents an average deviation in surface roughness in units of μm of the smoothed surface of the woven fabric;

Su represents an average deviation in surface roughness in units of μm of the non-smoothed surface of the woven fabric; and P represents fiber packing in units of % of the woven fabric.

The gastight woven fabric sheet for air bags of the present invention is optionally coated by or impregnated with a thermosetting resin in an amount of 1 to 20 g/m².

The process of the present invention for producing the gastight woven fabric sheet for air bag, as defined above comprises the steps of:

producing a woven fabric from a plurality of warp and weft yarns each comprising polyester multifilaments and each having a yarn thickness of 200 to 550 denier and a twist multiplier of 3000 or less, the woven fabric having a cover factor of 1,050 to 1,300 in each of the warp and weft directions thereof;

calendering the woven fabric in such a manner that only one surface of the woven fabric is smoothed by using a calendering metal roll at a surface heating temperature of 150° to 220° C. under a linear pressure of 500 kg/cm or more, at a calendering velocity of 1 to 50 m/min.

The process of the present invention optionally further comprises the step of coating or impregnating the calendered woven fabric with a thermosetting resin in an amount of 1 to 20 g/m².

BRIEF DESCRIPTION OF THE INVENTION

DESCRIPTION OF THE PREFERRED EMBODIMENTS

An air bag is used the protect an occupant, sitting in a front seat in an automobile or aircraft, by inflating the air bag, into the form of a sphere, when an accident occurs.

Figure 1:
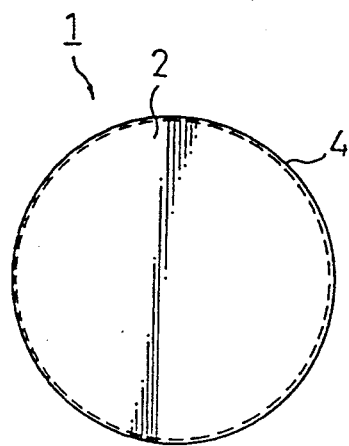
FIG. 1 is an occupant side front view of an embodiment of an air bag produced from the fabric sheet of the present invention.
Figure 2:
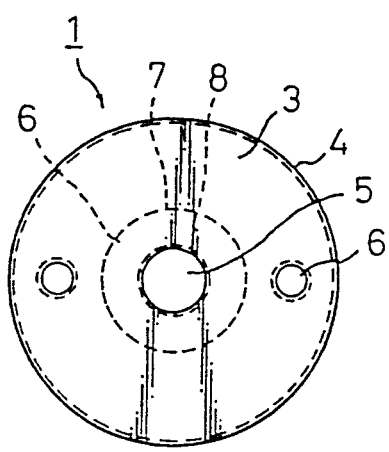
FIG. 2 is a steering wheel side back view of the air bag as shown in FIG. 1.

As shown in FIGS. 1 and 2, an air bag 1 comprises a circular top sheet portion 2 (facing the occupant) and a circular back sheet portion 3 (facing a steering wheel) thereof, and the circular top sheet portion and the circular back sheet portion are firmly joined to each other at the circular edge portions 4 thereof by stitching. The circular back sheet portion 3 of the air bag 1 is provided with a center hole 5 located in a center portion thereof, through which center hole 5, the air bag 1 is connected to an inflator (not shown in the drawings), and a gas generated in the inflator is allowed to flow into the air bag. In the circular back sheet portion 3 of the air bag 1, at least one, usually two or more, vent holes 6 are formed to allow a portion of the combustion gas introduced from the inflator into the air bag to be discharged through the vent hole. An apron 6 is arranged on the inside (back) face of the circular back sheet portion 3 and around the center hole 5 in the portion 3, and the edge portions 7 and 8 of the apron are firmly joined to the circular back sheet portion 3 by stitching. Also, in the circular back sheet portion 3, portions thereof around the vent holes 6 are stitched to aprons.

The air bag is received in a folded form within a space in front of a front seat of an automobile or aircraft.

Figure 3A:
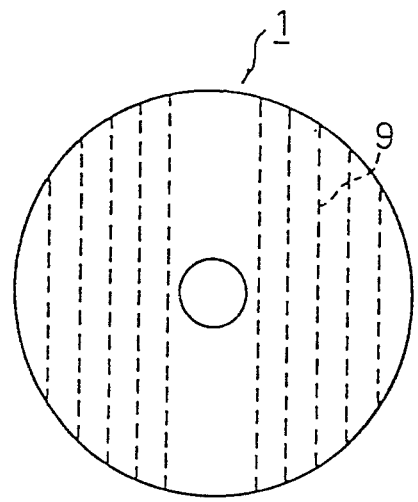
FIG. 3A is an explanatory front view of an embodiment of the air bag of the present invention, showing a plurality of dotted lines along which the air bag is folded.
Figure 3B:
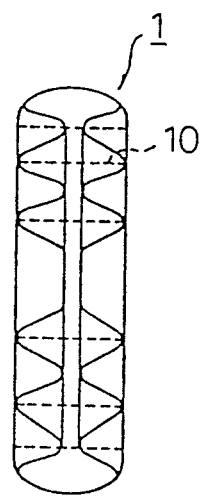
FIG. 3B is an explanatory back view of the air bag of the present invention folded along the dotted lines in FIG. 3A, showing a plurality of dotted lines along which the air bag is further folded.
Figure 3C:
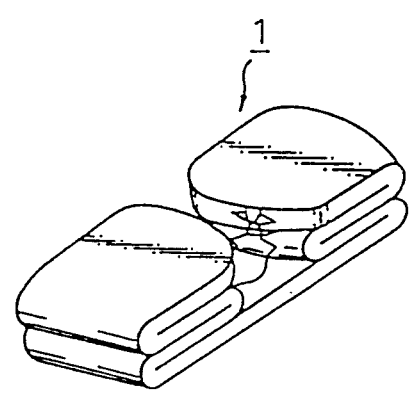
FIG. 3C is an explanatory perspective side view of the air bag of the present invention folded first along the dotted lines in FIG. 3A and then along the dotted lines in FIG. 3B.

Referring to FIGS. 3A, 3B, and 3C, an air bag is folded along the dotted lines 9 indicated in FIG. 3A, and then along the dotted lines 10 as indicated in FIG. 3B. The folded air bag 1 is then in the form as shown in FIG. 3C. The folded air bag is received in a container as shown in FIG. 4 and then arranged in a predetermined space in an automobile or aircraft.

Figure 4:
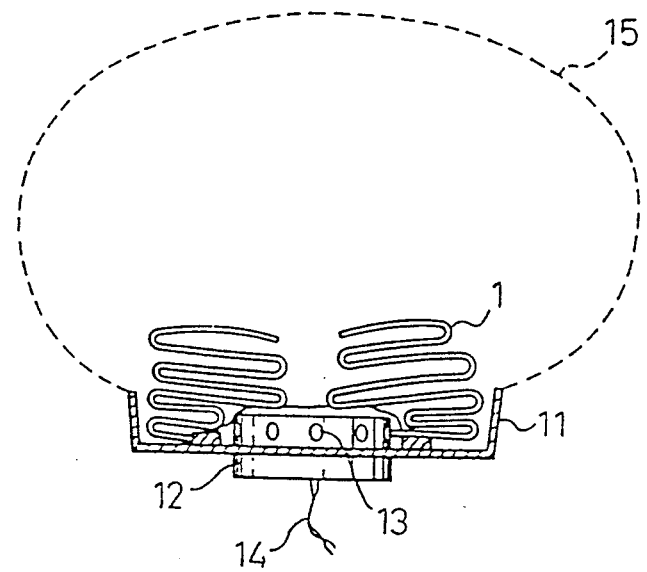
FIG. 4 is an explanatory front view of a folded air bag of the present invention connected to an inflator.

In FIG. 4, the folded air bag 1 is received in a container 11, and the center hole of the air bag 1 is connected to an inflator 12. The inflator 12 has a plurality of combustion gas-ejecting holes 13 opening inside of the center hole of the air bag 1.

When an automobile or aircraft is involved in a collision, an electric current flows through wires 14 connected to a power source (not shown) to generate a combustion gas in the inflator 12, and the combustion gas flows rapidly into the air bag 1 to inflate the air bag 1 into the approximately spherical form as shown by dotted lines 15.

Accordingly, the shock-absorbing air bag must be able to resist the high temperature and the high pressure of the flow of combustion gas.

The woven fabric sheet of the present invention for air bag comprises as a principal element, a woven fabric formed from warp and wefts each comprising a polyester multifilament yarn having a yarn thickness of 200 to 500 deniers, preferably 300 to 450 deniers, and a twist multiplier of 3,000 or less, preferably 2,500 or less, more preferably 1,400 to 2,250.

The twist multiplier of the multifilament yarn is defined by the following equation.

$$K = (T \times D^{\frac{1}{2}})$$

wherein K represents a twist multiplier of the yarn, T represents the number of twist per meter of the yarn, and D represents a total denier of the yarn.

If the yarn thickness is less than 200 deniers, the following disadvantages appear.

(a) The resultant fabric exhibits an unsatisfactory burst strength.

(b) The resultant fabric has a non-smoothed surface which exhibits an unsatisfactory bonding property to a reinforcing resin.

When the yarn thickness is more than 550 deniers, the resultant woven fabric has the following disadvantages.

(a) In the resultant woven fabric, the gaps between the yarns become too large and thus the air permeability of the woven fabric becomes too high.

(b) The resultant woven fabric is too thick to be folded easily and has an unsatisfactory hand, and thus the resultant air bag produced from the woven fabric becomes difficult to fold, and the space needed to receive the air bag becomes too big.

(c) The smoothed surface of the resultant woven fabric exhibits an unsatisfactory smoothness.

(d) The non-smoothed surface of the resultant woven fabric exhibits a lowered surface roughness and has an unsatisfactory bonding property to a reinforcing resin.

Also, when the twist multiplier of the polyester multifilament yarn is larger than 3,000, it becomes impossible to provide a woven fabric having a sufficiently reduced gas permeability, thus the resultant woven fabric has gas permeable perforations through which the inflating gas leaks, and the leaked gas sometimes burns an occupant in contact with the air bag. Also, the resultant woven fabric has disadvantages in that an adhesive cannot easily penetrate between the filaments and thus the non-smoothed surface exhibits a poor bonding property.

The woven fabric to be used in the woven fabric sheet of the present invention for air bag has a smoothed surface and an opposite non-smoothed surface thereof. The smoothed surface imparts a reduced air permeability to the resultant woven fabric, and the opposite non-smoothed surface exhibits a high bonding property to a reinforcing resin and enables the resultant woven fabric to be bond-reinforced with the reinforcing resin. The above-mentioned smoothed surface forms the outside surface of the resultant air bag, and the non-smoothed surface forms the inside surface of the air bag.

The woven fabric from which the airtight woven fabric sheet for an air bag of the present invention is formed is characterized by simultaneously satisfying all of the relationships (1) to (7):

$$78.74p \geq Q(p) \geq 7.874p \quad (1)$$

$$R1 > R2 \quad (2)$$

$$R1 > R3 \quad (3)$$

$$3.5 \geq R3 \geq 0.5 \quad (4)$$

$$Mu - Mc \geq 0.0005 \quad (5)$$

$$Su - Sc \geq 0.5 \quad (6)$$

and $$85 \geq P \geq 70. \quad (7)$$

The respective significance of the relationships (1) to (7) will be explained below.

$$78.74p \geq Q(p) \geq 7.874p \quad (1)$$

In the relationship (1), p represents a pressure in $kg/cm^2$ G, satisfying the relationship $0 \leq p \leq 0.03$, and Q(p) represents a gas-permeability function in $ml/cm^2/sec$ of the woven fabric under the pressure p.

Generally, when an air bag is inflated by a combustion gas blast generated in an inflater, a pressure applied to the air bag is 0.3 $kg/cm^2$ G or less.

Figure 5:
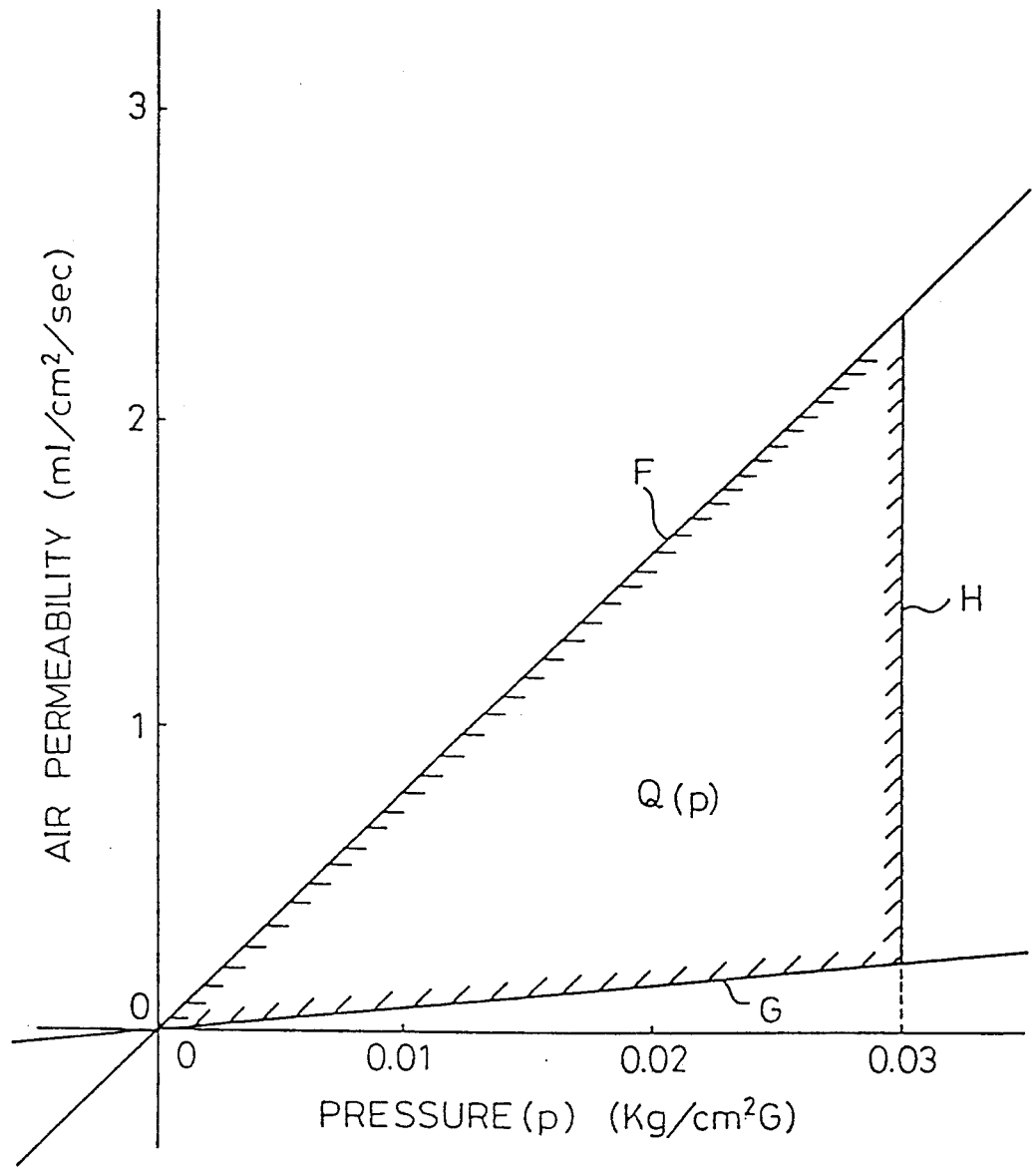
FIG. 5 is a graph showing a region of an air permeability function Q(p) of the airtight woven fabric of the present invention for air bag, in which region the relationship: $F(p) \geqq Q(p) \geqq G(p)$ is satisfied.

Referring to FIG. 5, a region of Q(p) satisfying the relationship (1) is indicated by a triangular area defined by straight lines F, G and H. FIG. 5 shows a pressure-air permeability relationship in which the pressure in $kg/cm^2$ G is indicated on the abscissa and the air permeability in $ml/cm^2/sec$ is indicated on the ordinate.

In the above-mentioned relationship $0 \leq p \leq 0.03$, Q(p) relates to a pressure within a range of from 0 to 0.03 $kg/cm^2$ G, and exists between the ordinate and the straight line H in FIG. 5. Also, a primary function F(p)=78.74p is represented by a straight line F, and a primary function G(p)=7.874p is represented by a straight line G in FIG. 5. Accordingly, the air permeability function Q(p) satisfying the relationship $78.74p \geq Q(p) \geq 7.874p$ exists between the straight line F and the straight line G.

Namely, the air permeability function Q(p) satisfying the relationship $78.74p \geq Q(p) \geq 7.874p$ in which $0 \leq p \leq 0.03$, is represented by a triangular area defined by the straight lines H, G and H.

Where the air permeability Q(p) of the woven fabric is larger than 78.74p (above straight line F), and when the air bag is inflated by a combustion gas blast, air permeable perforations are formed in the air bag, and the high temperature combustion gas passed through the perforations flows toward the occupant so as to cause the occupant to be burned. Accordingly, the Q(p) value of the woven fabric must be smaller than the primary function 78.74p (below straight line F).

Where the air permeability Q(p) of the woven fabric is smaller than the primary function 7.874p (below straight line G), the resultant woven fabric exhibits an excessively high stiffness, a hard feel, a poor tear strength, and an unsatisfactory bonding property to a reinforcing resin to be applied to the non-smoothed surface of the woven fabric.

The woven fabric for air bag of the present invention must satisfy the relationships:

$$R1 > R2 \quad (2)$$

$$R1 > R3 \quad (3)$$

and $$3.5 \geq R3 \geq 0.5. \quad (4)$$

In the relationships (2) to (4), R1 represents a radius of curvature in mm of a smoothed surface side half portion of a cross-sectional profile of at least one selected from the warp and weft yarns located in the smoothed surface portion of the woven fabric; R2 represents a radius of curvature in mm of an opposite side half portion of the above-mentioned cross-sectional profile; R3 represents a radius of curvature in mm of a non-smoothed surface side half portion of a cross-sectional profile of at least one selected from the warp and weft yarns located in the non-smoothed surface portion of the woven fabric.

Figure 6:
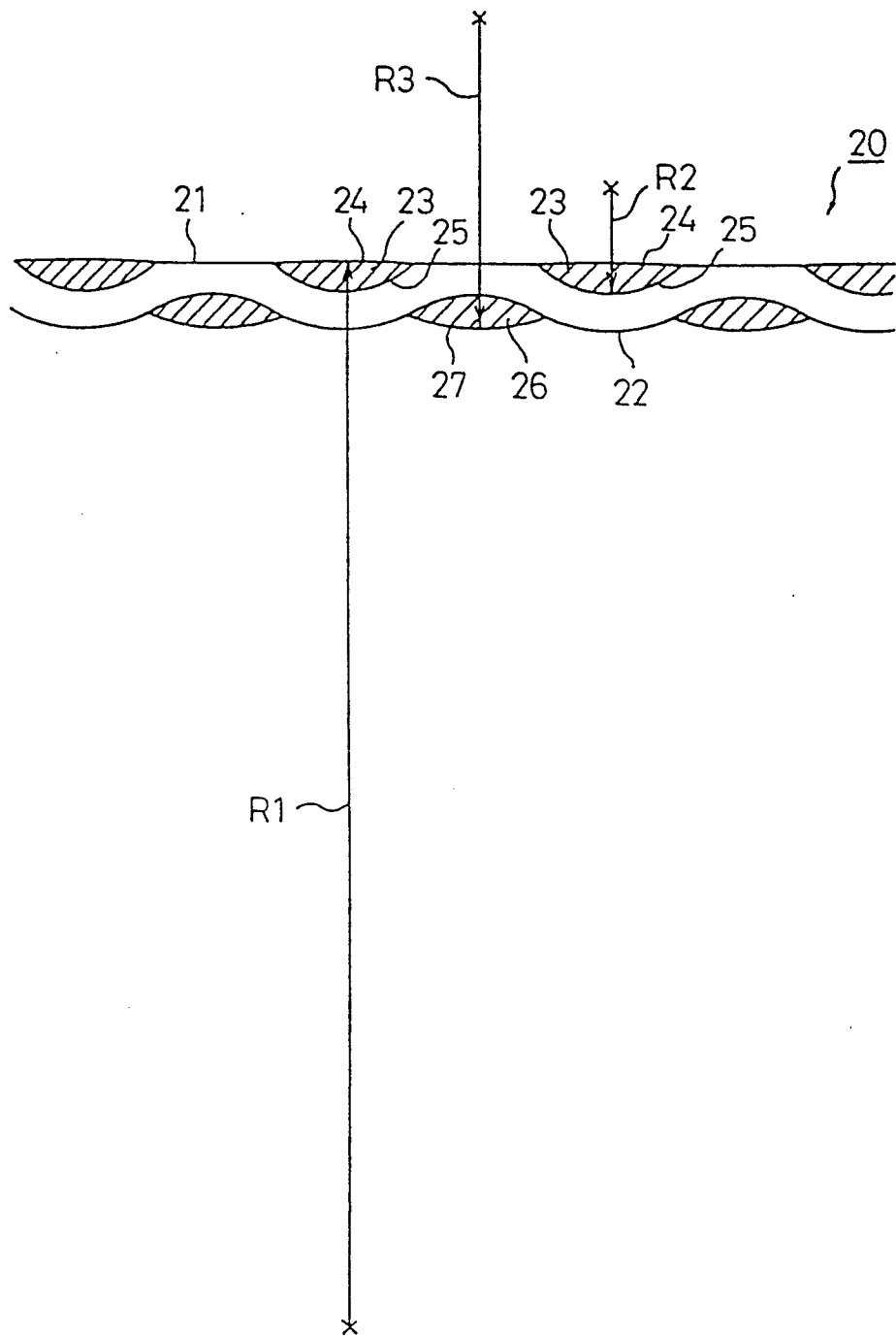
FIG. 6 is an explanatory cross-sectional profile of an embodiment of the woven fabric sheet of the present invention.

In the cross-sectional view of a woven fabric shown in FIG. 6, a woven fabric 20 has a smoothed surface 21 and a non-smoothed surface 22. In a cross-sectional profile of a warp or weft yarn 23 forming the smoothed surface, a smoothed surface side (outside) half portion 24 has a configuration similar to a semi arc shape having a radius of curvature R1, and an opposite side (inside) half portion 25 has a configuration similar to a semi arc shape having a radius of curvature R2. Also, in a cross-sectional view of a warp or weft yarn 26 forming a non-smoothed surface 22 of the woven fabric 20, the non-smoothed surface side (outside) half portion 27 has a configuration similar to a half arc shape having a radius of curvature R3. The values of the radii (radiuses) of curvature R1, R2 and R3 are respectively represented by an average value obtained by measuring the radii of curvature of half portions of cross-sectional profiles of 10 yarns.

In the present invention, the woven fabric must satisfy the relationship (2): R1>R2. If the values of R1 and R2 are in a relationship R1≦R2, in the resultant woven fabric, the smoothed surface portion thereof has an unsatisfactory packing of fibers, and thus when the air bag made from the woven fabric is rapidly inflated by a combustion gas blast, air-permeable perforations are easily formed in the woven fabric by the pressure of the gas.

In the present invention, the woven fabric must satisfy the relationship (3): R1>R3. If R1 and R3 are in the relationship of R1≦R3, the resultant non-smoothed surface of the woven fabric exhibits an unsatisfactory unsmoothness (roughness), and this the bonding property of this non-smoothed surface to a reinforcing resin becomes unsatisfactory. Therefore the reinforcement of the woven fabric is difficult.

In the present invention, the woven fabric must satisfy the relationship (4): 3.5≧R3≧0.5. When the R3 value is less than 0.5 mm, the non-smoothed surface portion of the resultant woven fabric exhibits an unsatisfactory packing of fibers, and thus when the air bag is inflated by a gas, gas-permeable perforations are easily formed in the woven fabric by the pressure of the gas. Also, when the R3 value is more than 3.5 mm, the non-smoothed surface of the resultant woven fabric exhibits an unsatisfactory unsmoothness (roughness) and thus the bonding property of the non-smoothed surface to the reinforcing resin becomes unsatisfactory, and it becomes difficult to obtain a satisfactory reinforcing effect on the woven fabric.

The airtight woven fabric sheet for air bag of the present invention must satisfy the relationship (5): Mu−Mc≧0.0005. Mu represents an average deviation in surface frictional coefficient of the non-smoothed surface of the woven fabric, and Mc represents an average deviation in surface frictional coefficient of the smoothed surface of the woven fabric. When the (Mu−Mc) value is less than 0.0005, the smoothed surface of the resultant woven fabric exhibits an excessively high frictional coefficient, and thus the outside surface of the air bag made from the woven fabric exhibits an excessively high frictional coefficient. Therefore, when an automobile or aircraft crashes and the air bag is inflated, there is a high risk that the outside surface of the inflated air bag impart an abrasion to any occupant with which the outside surface of the inflated air bag comes into contact. The (Mu−Mc) value is preferably 0.001 or more.

Also, in the present invention, the woven fabric must satisfy the relationship (6): Su−Sc≧0.5. Su represents an average deviation in surface roughness in μm of the non-smoothed surface of the woven fabric, and Sc represents an average deviation in surface roughness in μm of the smoothed surface of the woven fabric. If the (Su−Sc) value is less than 0.5, the smoothed surface of the resultant woven fabric (the outside surface of the air bag) exhibits an unsatisfactory smoothness, and thus when an automobile or aircraft crashes, and the air bag is inflated, there is a high risk that the outside surface of the air bag impart an abrasion to any occupant in contact with the outside surface of the air bag. Also, the non-smoothed surface of the resultant woven fabric exhibits an unsatisfactory unsmoothness (surface roughness) and thus the non-smoothed surface has an insufficient bonding property to a reinforcing resin. The (Su−Sc) value is preferably 1.0 or more.

The woven fabric of the present invention must satisfy the relationship (7): 85≧P≧70. P represents a fiber packing factor in % of the woven fabric. The term "fiber packing factor" is defined by the equation $$P\% = \frac{BSG}{TSG} \times 100$$

in which P is as mentioned above, BSG represents a bulk specific gravity of the woven fabric and TSG represents a true specific gravity of the woven fabric.

In the woven fabric in accordance with the present invention, when the fiber packing factor P is less than 70%, and the resultant air bag is rapidly inflated by a combustion gas blast, a plurality of gas-permeable perforations are formed in the air bag by the pressure of the gas so as to allow the gas to easily flow out from the air bag, and thus the air bag cannot sufficiently protect the occupant. If the fiber packing factor is more than 85%, the resultant fabric exhibits an excessively high stiffness, an unsatisfactory feel and insufficient burst and tear strengths. Therefore, when the air bag is rapidly inflated by the combustion gas blast, there is a high risk of forming a plurality of gas-permeable perforations in the air bag due to the gas pressure. The fiber packing factor is preferably 72 to 80%.

Preferably, the polyester multifilaments usable for the above-mentioned woven fabric of the present invention have a thickness of individual filaments in an range of from 0.5 to 2.5 deniers. When the individual filament thickness is more than 2.5 deniers, the air-permeability of the resultant woven fabric becomes too high, and the woven fabric becomes stiff. Also, it becomes difficult to smooth a surface of the woven fabric. When the resultant air bag is inflated, the woven fabric cannot prevent the flowing out of the gas therethrough, and a plurality of gas-permeable perforations are formed in the air bag so that the gas may burn an occupant in contact with the air bag. Further, the surface area of the non-smoothed surface of the woven fabric is reduced and the bonding property of the non-smoothed surface to reinforcing resin is lowered. If the individual filament thickness is less than 0.5 denier, the resultant woven fabric exhibits a reduced burst strength and the non-smoothed surface of the woven fabric exhibits an unsatisfactory bonding property. Accordingly, the individual filament thickness is preferably in the range of from 0.5 to 2.5 deniers. More preferably the individual filament thickness is 1 to 2 deniers.

The polyester multifilaments preferably comprise a polyester polymer selected from, for example, polyethyleneterephthalate, polybutyleneterephthalate, polyhexyleneterephthalate, polyethylenenaphthalate, polybutyleneterephthalate, polyethylene-1,2-bis(-phenoxy)ethane-4,4'-dicarboxylate, and copolymerized-polyesters, for example, polyethyleneisophthalate, polybutyleneterephthalate/naphthate, and polybutyleneterephthalate/decandicarboxylate.

Among the above-mentioned polyesters, polyethyleneterephthalate has well balanced mechanical properties and fiber-forming property and thus is preferably employed for the present invention.

When the multifilament yarn is an untwisted yarn, it is possible to provide a woven fabric having a low gas permeability. However, the untwisted multifilament yarn restricts the penetration of cm, adhesive through the non-smoothed surface of the resultant woven fabric. Accordingly, it is preferable to use the untwisted yarn in at least one of the warp and weft directions. When the untwisted yarn is used both in the warp and weft directions, it is necessary to secure a non-smoothed surface having a high bonding property by easing the calendering conditions as described hereinafter.

The woven fabric of the present invention preferably has a cover factor of 1,050 to 1,300 both in the warp and weft directions of the fabric. When polyester multifilament yarns having a yarn thickness of 420 deniers are employed, the above-mentioned cover factor value corresponds to a yarn density of 51 to 63 yarns/25.4 mm in the warp and weft directions of the woven fabric. It is preferable that the warp density and the weft density be as close as possible to each other. The term "cover factor in the warp direction" refers to the product of the square root of the denier value of the warp yarn with a warp density (yarns/25.4 mm). Also, the term "cover factor in the weft direction" refers to the product of the square root of the denier value of the weft yarn with the weft density (yarns/25.4 mm). When the cover factor is less than 1,050, the resultant woven fabric exhibits an unsatisfactory airtightness. Also, when the cover factor is more than 1,300, the resultant woven fabric has an increased stiffness and an unsatisfactory feel, whereas the increase in the gastightness is not satisfactory, and the resultant non-smoothed surface of the woven fabric exhibits a reduced bonding ability. Accordingly, the cover factor is preferably in the range of from 1,050 to 1,300, more preferably from 1,080 to 1,250. When polyester multifilament yarns having a yarn thickness of 420 deniers are employed, it is preferable that the resultant woven fabric has a yarn density of 51 to 63 yarns/25.4 mm, more preferably 53 to 61 yarns/25.4 mm in the warp and weft directions.

When a woven fabric is formed at a significantly enhanced warp density and at a significantly reduced weft density, even if the resultant woven fabric has an enhanced cover factor in appearance, the airtightness of the woven fabric is not satisfactorily improved. Also, the resultant woven fabric becomes too stiff. In this case, the resultant woven fabric exhibits a significantly reduced burst strength in one direction, and thus is not suitable for the air bag. Also, the non-smoothed surface of the resultant fabric exhibits a significantly reduced bonding property in one direction.

Preferably, the airtight woven fabric sheet for air bag of the present invention has a tensile strength of 180 kg/3 cm or more and an ultimate elongation of 25% or more.

When the tensile strength of the woven fabric is less than 180 kg/3 cm, the resultant air bag exhibits an insufficient shock-absorbing capacity upon being inflated, and gas-permeable perforations are easily formed in the air bag and the burst strength of the air bag becomes insufficient. Accordingly, the woven fabric usable for the present invention preferably has a tensile strength of 180 kg/3 cm or more, more preferably 200 kg/3 cm or more.

If the ultimate elongation of the woven fabric is less than 25%, the resultant air bag exhibits an insufficient shock-absorbing capacity, air-permeable perforations are easily formed in the air bag, and the air bag has an unsatisfactory burst strength. Accordingly, the woven fabric preferably has an ultimate elongation of 25%, more preferably 27% or more.

In the airtight woven fabric for air bag of the present invention, the yarns from which the woven fabric is formed preferably have a tensile strength of 8.0 g/denier or more and an ultimate elongation of 18% or more.

When the tensile strength of the woven-fabric-forming yarns is less than 8.0 g/denier, the resultant air bag is easily broken upon being inflated. Therefore, the yarns preferably have a tensile strength of 8.0 g/denier or more, more preferably 8.3 g/denier or more.

When the ultimate elongation of the yarns from which the woven fabric is formed, is less than 18%, the resultant air bag is easily broken upon being inflated. Therefore, the ultimate elongation of the yarns are preferably 18% or more, more preferably 20% or more.

Although the woven fabric of the present invention preferably has a 1/1 plain weave structure or a 2/2 mat weave structure, the weave structure may be a 2/1 twill weave structure or a 2/2 twill weave structure.

The airtight woven fabric sheet for air bag of the present invention can be produced by the following process.

First, a woven fabric is produced from polyester filament yarns having a yarn thickness of 200 to 550 deniers and a twist multiplier of 3,000 or less (preferably those satisfying the above-mentioned requirements for individual filament thickness and the number of twists). In this case, the polyester multifilament yarns preferably have a dry heat shrinkage of 3% to 8% at a temperature of 150° C. and a shrinkage of 1.5 to 5% in boiling water.

When the dry sheet shrinkage of the multifilament yarns at a temperature of 150° C. is more than 8%, the shrinkage of the resultant woven fabric in the heat setting and calendering steps after scouring step is too large, uniform shrinkage of the fabric is hindered, the gaps between the yarns becomes too large, and therefore, in the resultant fabric, the gas-permeability is too high and the smoothness is high.

When the dry heat shrinkage is less than 3%, the shrinkage of the resultant woven fabric by the thermal setting and calendering after the scouring is too small, and it is impossible to obtain a woven fabric having a low gas permeability and a high smoothness. Accordingly, the multifilament yarn preferably has a dry heat shrinkage of 3 to 8%, more preferably 4 to 7%, at a temperature of 150° C.

Also, when the shrinkage of the multifilament yarns in boiling water is more than 5%, the resultant woven fabric shrinks excessively by the scouring or heat setting, and is easily wrinkled. Therefore, the woven fabric can be calendered only at a low efficiency, and it becomes difficult to obtain a woven fabric having a high smoothness. Also, the above-mentioned type of woven fabric is left to stand over a long time, there is a tendency for the airtightness and the smoothness thereof to decrease.

If the shrinkage of the multifilament yarns in boiling water is 1.5% or less, the resultant woven fabric exhibits a poor shrinkage in the scouring or thermal setting steps, it becomes difficult to obtain a woven fabric having a low gas permeability and a high smoothness. Accordingly, the multifilament yarns have a shrinkage of 1.5 to 5%, more preferably 2 to 4%, in boiling water.

To smooth on surface of the woven fabric produced in the above-mentioned manner and maintain an opposite surface in a non-smoothed structure, scouring and thermal setting procedures are applied to the woven fabric and thereafter, the resultant woven fabric is subjected to a calendering procedure in which the only one surface of the woven fabric is selectively brought into contact with a metal roll. This calendering procedure is carried out by using a pair of an upper metal roll and a lower elastic roll, and a surface treated by the metal roll is smoothed. When metal/metal calendering rolls are used, a difference in temperature is impart to the calendering rolls and a surface treated with a metal roll having a higher temperature than the other roll is smoothed. The surface temperature of the metal roll forming a smoothed surface is generally 150° C. to 220° C., preferably 160° C. to 200° C. The roll pressure is generally 500 kg/cm or more, preferably 550 to 1,400 kg/cm. The roll velocity is generally 1 to 50 m/min, preferably 2 to 25 m/min. In this procedure, to obtain a sufficient heat-pressurizing effect, for example, a contact type or non-contact type heater may be arranged immediate before the calender, to preheat the woven fabric. Also, the woven fabric may be processed at a low velocity of about 1 to 4 m/min.

Usually, the calendering procedure is applied at least once to only one surface of the woven fabric. However, the calendering procedure may be applied twice or more. If the calendering is applied to both the surfaces of the woven fabric, the woven fabric has a stiff touch and becomes a paper-like woven fabric. Also, when both the surfaces of the woven fabric are smoothed, the smoothed surfaces have an enhanced resistance to penetration of an adhesive thereinto and exhibit a lowered anchor effect for the adhesive and thus the peeling strength of the adhesive is significantly reduced. However, when the calendering procedure is applied to only one surface of the woven fabric, the opposite surface brought into contact with the elastic roll is not smoothed. The non-smoothed surface of the woven fabric exhibits a good adhesion to the adhesive and thus has a good bonding property. In the air bag formed from the above-mentioned woven fabric, it is easy to reinforce portions around the inflator and top cloth (apron) of the air bag by way of adhesive-reinforcement.

The airtight woven fabric sheet for air bag of the present invention can be employed as a non-coated woven fabric sheet for air bag, without coating with a silicone rubber or a chloroprene rubber.

Nevertheless, it is preferable that the non-coated woven fabric be coated or impregnated with a thermosetting resin in an amount of 1 to 20 g/m$^2$, to prevent a fray of yarns due to cutting and sewing of the woven fabric. When the coating is applied, the smoothed surface is preferably coated with the above-mentioned resin.

As a thermosetting resin, silicone rubbers, urethane resins and polyester resins can be employed. Among them, those having an enhanced softness and durability are preferably employed. For example, as the silicone rubber, addition reaction type, catalyst-containing type silicone rubbers are preferably employed. Particularly, dimethylsilicones, methylvinylsilicones, methylphenylsilicones and fluorosilicones are usable for the present invention. Among them, the methylvinylsilicones are appropriate in view of the mechanical properties, cost and processability thereof.

The thermosetting resin may contain therein an inorganic compound, for example, a flame retardant, and silica, and a filler.

The thermosetting resin is preferably applied in an amount of 1 to 20 g/m$^2$, more preferably 2 to 20 g/m$^2$ to the woven fabric. When the amount of the thermosetting resin applied to the woven fabric is more than 20 g/m$^2$, the resultant woven fabric exhibits an unsatisfactory feel, and the resultant air bag has an increased weight and a decreased compactness and becomes difficult to be received.

Also, when the amount of the resin is less than 1 g/m$^2$, the resultant resin layer exhibits a poor mechanical strength and thus is easily damaged. The smoothed surface of the airtight woven fabric sheet for air bag of the present invention is preferably utilized to form an outside surface of the air bag. If a non-smoothed surface of the woven fabric is used to form the outside surface of the air bag, and when the resultant air bag is rapidly inflated, the outside surface of the air bag will impart an abrasion to an occupant in contact with the outside surface of the air bag. Also, when the non-smoothed surface of the air bag to be adhesion-reinforced is used to form an inside surface of the resultant air bag, the resultant air bag exhibits a good appearance.

When an air bag for a driver seat is formed from an airtight woven fabric sheet for air bag for the present invention, two circular pieces are cut from the woven fabric sheet and joined at the circular edge portions thereof by stitching. In this case, the smoothed surface of the airtight woven fabric sheet for air bag are sewn so as to form the outside surface of the air bag which comes into contact with the human body. If the smoothed surface of the woven fabric forms the inside surface of the air bag, it causes that the non-smoothed surface of the woven fabric to form the outside surface of the air bag, and when the air bag is rapidly inflated, there is a high risk of the outside surface of the inflated air bag abrading an occupant that comes into contact with the inflating air bag. Also, it causes the air bag to be adhesion reinforced on the outside surface thereof, and thus the resultant air bag exhibits an unsatisfactory appearance. The same problems as mentioned above appear on the air bag for the passenger.

The airtight woven fabric sheet for air bags of the present invention has a low gas permeability in comparison with conventional non-coated airtight woven fabric having two smoothed surfaces thereof, in spite of the fact that only one surface of the woven fabric is smoothed, and therefore, there is no risk of forming gas-permeable perforations and imparting an abrasion scratch to an occupants face when the air bag is inflated. Also, since the woven fabric sheet of the present invention has only one calendered surface thereof, the feel of the woven fabric is soft. When coated with a resin to prevent the fraying of yarns, the resin can be uniformly applied in a reduced amount to the woven fabric, because the woven fabric per se has an enhanced airtightness.

Also, by using, in the production of an air bag, the smoothed surface of the woven fabric to form an outside surface of the air bag, the air bag does not impart an abrasion to an occupant, and the opposite surface which is non-smoothed can be reinforced by a reinforcing adhesive.

In a conventional air bag coated with a chloroprene rubber, the side force of the air bag can be adhesion-reinforced by adhesion of a non-vulcanized rubber at a high temperature under a pressure. In the non-coated air bag, however, the above-mentioned reinforcing means must be replaced by another means. Particularly, since the polyester woven fabric has a lower burst strength than that of nylon 66 woven fabric, a most effective reinforcing means for the polyester woven fabric is to reinforce it with a reinforcing adhesive.

The conventional airtight woven fabric in which the two surfaces thereof are calendered, exhibits a poor bonding property to various adhesives. Compared with this, the woven fabric of the present invention can be effectively reinforced with the adhesives because the non-smoothed surface thereof has a high anchoring effect to the adhesives. When the airtight woven fabric sheet for air bags of the present invention is used, a portion around the inflator and the top cloth (apron) of the air bag can be reinforced by an adhesive by utilizing the high roughness of the non-smoothed surface. In the air bag of the present invention, since the non-smoothed surface of the woven fabric forms an inside surface of the air bag, a reinforcement can be applied to the inside surface of the air bag. In a polyester air bag, if the air bag is connected to a high-power inflator, and when the portion around the inflator and the top cloth (apron) of the air bag are not reinforced, the stitched portions of the air bag are sometimes damaged upon being inflated, and thus the resultant air bag exhibits an insufficient burst strength.

The stitched portions are formed on reinforcing fabric sheets on the top cloth or bottom cloth or on joining portions of belt fabric. The reinforcement of the stitched portions is preferably carried out using an adhesive. The adhesion-reinforcement can be effected by using the adhesive alone or by using both stitching and the adhesive.

The adhesion can be effected by using any adhesives selected from conventional adhesives. In view of operational properties, however, thermoplastic nonwoven fabrics or thermoplastics film are preferably used for the adhesion. Among those materials, nonwoven fabrics and films made of a copolymerized polyester resin having a low melting point are more preferably used. The thermoplastic nonwoven fabrics and films can be used by heating under pressure. Those nonwoven fabrics and films can retain a high heat resistance and a high humidity resistance over a long period of time.

Also, thermosetting silicone rubbers can be used for the adhesion. In this case, various condensation reaction type or addition reaction type silicone rubbers can be utilized. Preferably, the addition reaction type silicone rubbers are used due to the high bonding force thereof. As a reinforcing fabric, a woven fabric the same as or different from the airtight woven fabric sheet for air bag of the present invention can be used. Nevertheless, the same woven fabric as the airtight woven fabric sheet for air bag of the present invention is preferably used as a reinforcing fabric, because they are the same in tensile strength, ultimate elongation and modulus. The reinforcing woven fabric is used preferably in the same direction as the airtight woven fabric. Also, the airtight woven fabric sheet for air bag and the reinforcing woven fabric are used preferably in such a manner that the non-smoothed surface of the reinforcing woven fabric is brought into contact with the non-smoothed surface of the airtight woven fabric sheet for air bag and those non-smoothed surfaces are bonded to each other through an adhesive. If necessary, the reinforcing woven fabric may be laminate-bonded in two or three layers to the air bag.

Since the airtight woven fabric sheet for air bag of the present invention as mentioned above, has a high airtightness, the fraying of the yarns can be prevented by coating or impregnating with a reduced amount of thermosetting resin, and thus the resultant air bag has an enhanced compactness for packing in comparison with conventional air bags.

Also, since one surface of the woven fabric has a high smoothness, the above-mentioned resin can be uniformly coated the smoothed surface.

Further, the resin-applied woven fabric can retain a high level of peeling strength even after storing for a long period of time.

EXAMPLES

The present invention will be further illustrated by way of the following specific examples.

In these examples, the measurements of the properties of filaments and woven fabrics and the evaluation of the air bags were carried out in accordance with the following test methods.

Gas permeability

This was measured by using a gas permeability tester (trademark: FX 3300, made by Textest Co.) having an orifice with a cross-sectional opening area of 100 $cm^2$.

Radius of curvature of cross-sectional profile of yarn

A cross-sectional profile of a yarn was photographed by an electron micro-scope, and the radius of curvature of the cross-sectional profile was measured by an approximation method.

Average deviation in frictional coefficient

A fabric was subjected to a measurement of frictional coefficient thereof by using a surface tester (trademark: KEs-FB4, made from Katotec Co.), and an average deviation in the measured values of the frictional coefficient was calculated. The average deviation was indicated by an average value of the test results in warp and weft directions.

Average deviation in surface roughness

In measurement of the above-mentioned frictional coefficient, a vertical movement was measured, and the average deviation was calculated from the measurement result. The average deviation was indicated by an average value of test results in warp and weft directions.

Fiber packing

A bulk specific gravity of a woven fabric was calculated by dividing the thickness of the woven fabric by the basis weight of the woven fabric. The fiber packing of the woven fabric was obtained by dividing the bulk specific gravity by a true specific gravity of the fibers. The thickness of the woven fabric was measured by a micrometer (made by Mitsutoyo Seisakusho K.K.).

Dry heat shrinkage

A polyester multifilament yarn in a non-twisted state was allowed to shrink at a temperature of 150° C. for 30 minutes. The shrinkage of the yarn was calculated in accordance with the following equation.

Dry heat shrinkage $(\%) = ((L - L_0)/L) \times 100$ wherein L represents the length of the filament yarn before shrinking, $L_0$ represents the length of the yarn after shrinking.

Shrinkage in boiling water

A polyester multifilament yarn in a non-twisted state was allowed to shrink in boiling water for 30 minutes. The shrinkage of the yarn was calculated in a manner similar to that for the dry heat shrinkage.

Tensile strength of woven fabric

This was measured in accordance with Japanese Industrial Standard (JIS) L-1096 (tensile strength-testing method for woven fabrics). In this measurement, the width of the woven fabric specimen was 3 cm, the stretching speed was 20 cm/min, the length of the specimen was 20 cm, and an average was calculated from the measurement results in warp and weft directions.

Tensile strength of yarn

This was measured in accordance with JIS L-1013 (tensile strength-testing method for yarns). In this measurement, the warp and weft yarns were taken out from a woven fabric, and subjected to a tensile strength measurement at a stretching speed of 20 cm/min and at a specimen length of 20 cm. An average of the measurement results in warp and weft directions was calculated.

Ultimate elongation of yarn

This was measured simultaneously with the above-mentioned measurement of the tensile strength of the yarn.

Touch

The touch and softness of the surface of a woven fabric were evaluated by an organoleptic test, while assuming that an air bag is made from the woven fabric, and a human face is strongly pressed against the air bag upon crashing.

Resistance to inflation

A module containing an air bag having an inside volume of 60 liters was placed in a seat for driver, and connected to an inflator (made by Morton International, Type I). The air bag was heated at a temperature of 95° C. for 6 hours or more and then immediately inflated. It was observed by using a high speed video recorder whether or not gas permeable perforations were formed in the air bag, whether or not the air bag was damaged, and how high is the degree of shielding from the inflation gas provided by the air bag.

Burst strength

A burst strength ($kg/cm^2 G$) of the above-mentioned 60 liter air bag was measured by rapidly blowing a high pressure nitrogen gas thereinto at room temperature. Also, it was observed whether or not the bag was damaged.

EXAMPLES 1 TO 13

In each of Examples 1 to 13, the polyester multifilament yarns having the physical properties as shown in Tables 1 to 5 were used to produce a plain weave fabric having a high density. The woven fabric was scoured, heat set and calendered on one surface thereof. The calendering conditions were a temperature of 80° to 200° C., a pressure 80 to 210 tons (a linear pressure of 533 to 1400 kg/cm) and a speed of 4 to 6 m/min. The calender treatment was carried out once or twice. Also, certain woven fabrics were treated with a silicone rubber to prevent fraying of yarns from the fabric.

Then, a 60 liter air bag for a driver seat was produced from the woven fabric. In this production procedure, the smoothed surface of the calendered woven fabric was arranged so as to form the outside surface of the air bag.

The top cloth and an environmental portion of the air bag around the inflator were reinforced by adhering pieces of a reinforcing woven fabric thereto with an adhesive. The reinforcing woven fabric was of the same type as the woven fabric for the air bag and adhered in the same direction as the air bag-forming woven fabric. The type of the adhesive was as indicated in Table 1 to 5. The air bag as mentioned above was subjected to an inflation test and a burst test.

The physical properties of the woven fabric and the performance of the air bag are shown together in Table 1 to 5.

TABLE 1

| Item | | Example No. | | |
|---|---|---|---|---|
| | | Example 1 | Example 2 | Example 3 |
| Properties of yarn | Yarn thickness (de) | 420 | 420 | 500 |
| | Individual filament thickness (d) | 1.7 | 1.7 | 2.0 |
| | Twist coefficient | | | |
| | warp | 2049 | 1639 | 0 |
| | weft | 0 | 0 | 0 |
| | Dry heat shrinkage (%) | 4.5 | 4.5 | 5.0 |
| | Shrinkage in boiling water (%) | 2.1 | 2.1 | 2.6 |

TABLE 1-continued

| Item | | | Example 1 | Example 2 | Example 3 |
|---|---|---|---|---|---|
| Properties of woven fabric | Tensile strength (g/de) | | 8.9 | 8.8 | 9.0 |
| | Ultimate elongation of yarn taken out from woven fabric (%) | | 22.0 | 21.1 | 23.6 |
| | Basis weight (g/m$^2$) | | 237 | 229 | 245 |
| | Thickness (mm) | | 0.219 | 0.212 | 0.234 |
| | Cover factor | | | | |
| | warp | | 1189 | 1187 | 1168 |
| | weft | | 1227 | 1107 | 1086 |
| | Tensile strength (kg/3 cm) | | 236 | 227 | 267 |
| | Ultimate elongation (%) | | 30.8 | 29.8 | 34.4 |
| | Calender treatment | | Twice on one surface | Twice on one surface | Twice on one surface |
| | Q(p) (ml/cm$^2$/sec) | | 24.5 p | 21.3 p | 31.9 p |
| | R1 | | 3.90 | 4.10 | 4.47 |
| | R2 | | 0.40 | 0.50 | 0.55 |
| | R3 | | 1.15 | 1.32 | 1.44 |
| | Mu − Mc | | 0.005 | 0.004 | 0.007 |
| | Su − Sc (μm) | | 2.1 | 1.5 | 2.7 |
| | P (%) | | 78.4 | 78.9 | 76.6 |
| Treatment by thermosetting resin | Type of resin | | None | None | None |
| | Amount (g/m$^2$) | | 0 | 0 | 0 |
| Air bag | Touch | | Very good | Very good | Good |
| | Resistance to inflation | Perforation, damage | Nothing | Nothing | Nothing |
| | | Gas-shielding property | Very good | Very good | Very good |
| | Adhesion reinforcement | Applied or not | Applied | Applied | Applied |
| | | Points | Environs of inflator and center of top cloth | Environs of inflator and center of top cloth | Environs of inflator and center of top cloth |
| | | Outside or inside of bag | Inside of bag | Inside of bag | Inside of bag |
| | | Type of woven fabric | Same as air bag | Same as bag | Same as bag |
| | | Adhesive | Silicone rubber | Silicone rubber | Silicone rubber |
| | | Direction | Same direction | Same direction | Same direction |
| | Burst strength (kg/cm$^2$G) | | 2.0 | 1.9 | 2.3 |
| General evaluation | | | Good | Good | Good |

TABLE 2

| Item | | | Example 4 | Example 5 | Example 6 |
|---|---|---|---|---|---|
| Properties of yarn | Yarn thickness (de) | | 420 | 420 | 420 |
| | Individual filament thickness (d) | | 4.4 | 1.7 | 1.3 |
| | Twist coefficient | | | | |
| | warp | | 0 | 2049 | 0 |
| | weft | | 0 | 0 | 0 |
| | Dry heat shrinkage (%) | | 4.3 | 4.5 | 4.5 |
| | Shrinkage in boiling water (%) | | 2.5 | 2.2 | 2.2 |
| Properties of woven fabric | Tensile strength (g/de) | | 8.8 | 9.2 | 8.3 |
| | Ultimate elongation of yarn taken out from woven fabric (%) | | 22.4 | 23.0 | 20.9 |
| | Basis weight (g/m$^2$) | | 228 | 231 | 237 |
| | Thickness (mm) | | 0.221 | 0.224 | 0.200 |
| | Cover factor | | | | |
| | warp | | 1086 | 1148 | 1209 |
| | weft | | 1086 | 1107 | 1189 |
| | Tensile strength (kg/3 cm) | | 230 | 234 | 222 |
| | Ultimate elongation (%) | | 31.0 | 31.3 | 30.1 |
| | Calender treatment | | Twice on one surface | Once on one surface | Twice on one surface |
| | Q(p) (ml/cm$^2$/sec) | | 32.7 p | 75.6 p | 9.3 p |
| | R1 | | 3.65 | 2.11 | 5.34 |
| | R2 | | 0.35 | 0.40 | 0.77 |
| | R3 | | 1.02 | 0.88 | 3.45 |
| | Mu − Mc | | 0.010 | 0.003 | 0.002 |
| | Su − Sc (μm) | | 3.4 | 1.3 | 1.2 |
| | P (%) | | 74.6 | 70.4 | 79.5 |
| Treatment by thermosetting resin | Type of resin | | None | None | None |
| | Amount (g/m$^2$) | | 0 | 0 | 0 |
| Air bag | Touch | | Good | Very good | Good |
| | Resistance | Perforation, | Nothing | Nothing | Nothing |

TABLE 2-continued

| Item | | Example 4 | Example 5 | Example 6 |
|---|---|---|---|---|
| | to inflation damage | | | |
| | Gas-shielding property | Very good | Good | Very good |
| Adhesion reinforcement | Applied or not | Applied | Applied | Applied |
| | Points | Environs of inflator and center of top cloth | Environs of inflator and center of top cloth | Environs of inflator and center of top cloth |
| | Outside or inside of bag | Inside of bag | Inside of bag | Inside of bag |
| | Type of woven fabric | Same as bag | Same as bag | Same as bag |
| | Adhesive | Silicone rubber | Silicone rubber | Silicone rubber |
| | Direction | Same direction | Same direction | Same direction |
| | Burst strength (kg/cm²G) | 2.1 | 1.8 | 2.0 |
| General evaluation | | Good | Good | Good |

TABLE 3

| Item | | Example 7 | Example 8 | Example 9 |
|---|---|---|---|---|
| Properties of yarn | Yarn thickness (de) | 420 | 420 | 550 |
| | Individual filament thickness (d) | 1.7 | 1.7 | 2.5 |
| | Twist coefficient | | | |
| | warp | 0 | 2049 | 2814 |
| | weft | 0 | 0 | 0 |
| | Dry heat shrinkage (%) | 4.5 | 7.0 | 5.0 |
| | Shrinkage in boiling water (%) | 2.2 | 5.0 | 3.3 |
| Properties of woven fabric | Tensile strength (g/de) | 8.9 | 8.4 | 8.9 |
| | Ultimate elongation of yarn taken out from woven fabric (%) | 22.0 | 27.3 | 23.7 |
| | Basis weight (g/m²) | 241 | 253 | 250 |
| | Thickness (mm) | 0.221 | 0.225 | 0.229 |
| | Cover factor | | | |
| | warp | 1168 | 1278 | 1203 |
| | weft | 1107 | 1263 | 1220 |
| | Tensile strength (kg/3 cm) | 234 | 245 | 240 |
| | Ultimate elongation (%) | 34.9 | 36.3 | 31.7 |
| | Calender treatment | Twice on one surface | Twice on one surface | Twice on one surface |
| | Q(p) (ml/cm²/sec) | 21.8 p | 8.7 p | 34.2 p |
| | R1 | 4.37 | 5.29 | 4.22 |
| | R2 | 0.41 | 0.89 | 0.50 |
| | R3 | 2.25 | 3.12 | 1.59 |
| | Mu − Mc | 0.004 | 0.0008 | 0.006 |
| | Su − Sc (μm) | 2.0 | 0.7 | 2.3 |
| | P (%) | 77.9 | 81.5 | 79.1 |
| Treatment by thermosetting resin | Type of resin | Silicone rubber | None | None |
| | Amount (g/m²) | 5 | 0 | 0 |
| Air bag | Touch | Very good | Good | Very good |
| | Resistance to inflation | Perforation, damage | Nothing | Nothing | Nothing |
| | | Gas-shielding property | Very good | Very good | Very good |
| | Adhesion reinforcement | Applied or not | Applied | Applied | Applied |
| | | Points | Environs of inflator and center of top cloth | Environs of inflator and center of top cloth | Environs of inflator and center of top cloth |
| | | Outside or inside of bag | Inside of bag | Inside of bag | Inside of bag |
| | | Type of woven fabric | Same as bag | Same as bag | Same as bag |
| | | Adhesive | Silicone rubber | Silicone rubber | Silicone rubber |
| | | Direction | Same direction | Same direction | Same direction |
| | Burst strength (kg/cm²G) | 2.0 | 2.1 | 2.4 |
| General evaluation | | Good | Good | Good |

TABLE 5 / TABLE 5-continued

| Item | | Example 10 | Example 11 |
|---|---|---|---|
| Properties of yarn | Yarn thickness (de) | 420 | 420 |
| | Individual filament thickness (d) | 6.0 | 1.7 |
| | Twist coefficient | | |

TABLE 5-continued

| Item | | Example 10 | Example 11 |
|---|---|---|---|
| | warp | 2459 | 2049 |
| | weft | 0 | 0 |
| | Dry heat shrinkage (%) | 4.5 | 4.5 |
| | Shrinkage in boiling water (%) | 2.1 | 2.1 |
| Properties of woven fabric | Tensile strength (g/de) | 8.7 | 8.9 |
| | Ultimate elongation of yarn taken out from woven fabric (%) | 22.1 | 22.0 |
| | Basis weight (g/m²) | 234 | 237 |
| | Thickness (mm) | 0.231 | 0.219 |
| | cover factor | | |
| | warp | 1188 | 1189 |
| | weft | 1210 | 1227 |
| | Tensile strength (kg/3 cm) | 230 | 236 |
| | Ultimate elongation (%) | 31.8 | 30.8 |
| | Calender treatment | Twice on one surface | Twice on one surface |
| | Q(p) (ml/cm²/sec) | 77.7 p | 24.5 p |
| | R1 | 4.01 | 3.90 |
| | R2 | 0.55 | 0.40 |
| | R3 | 1.09 | 1.15 |
| | Mu − Mc | 0.001 | 0.005 |
| | Su − Sc (μm) | 1.7 | 2.1 |
| | P (%) | 73.4 | 78.4 |
| Treatment by thermosetting resin | Type of resin | None | None |
| | Amount (g/m²) | 0 | 0 |
| Air bag | Touch | Good | Very good |
| | Resistance to inflation | Perforation, damage | Nothing | Nothing |
| | | Gas-shielding property | Good | Very good |
| | Adhesion reinforcement | Applied or not | Applied | Applied |
| | | Points | Environs of inflator and center of top cloth | Environs of inflator and center of top cloth |
| | | Outside or inside of bag | Inside of bag | Inside and outside of bag |
| | | Type of woven fabric | Same as bag | Same as bag |
| | | Adhesive | Silicone rubber | Silicone rubber |
| | | Direction | Same direction | Same direction |
| | Burst strength (kg/cm²G) | 2.1 | 2.2 |
| General evaluation | | Good | Good |

TABLE 5

| Item | | Example 12 | Example 13 |
|---|---|---|---|
| Properties of yarn | Yarn thickness (de) | 420 | 420 |
| | Individual filament thickness (d) | 1.7 | 1.7 |
| | Twist coefficient | | |
| | warp | 2049 | 2814 |
| | weft | 0 | 0 |
| | Dry heat shrinkage (%) | 4.5 | 4.5 |
| | Shrinkage in boiling water (%) | 2.1 | 2.1 |
| Properties of woven fabric | Tensile strength (g/de) | 8.9 | 8.9 |
| | Ultimate elongation of yarn taken out from woven fabric (%) | 22.0 | 22.0 |
| | Basis weight (g/m²) | 237 | 237 |
| | Thickness (mm) | 0.219 | 0.219 |
| | Cover factor | | |
| | warp | 1189 | 1189 |
| | weft | 1227 | 1227 |
| | Tensile strength (kg/3 cm) | 236 | 236 |
| | Ultimate elongation (%) | 30.8 | 30.8 |
| | Calender treatment | Twice on one surface | Twice on one surface |
| | Q(p) (ml/cm²/sec) | 24.5 p | 24.5 p |
| | R1 | 3.90 | 3.90 |
| | R2 | 0.40 | 0.40 |
| | R3 | 1.15 | 1.15 |
| | Mu − Mc | 0.005 | 0.005 |
| | Su − Sc (μm) | 2.1 | 2.1 |
| | P (%) | 78.4 | 78.4 |
| Treatment by thermosetting resin | Type of resin | None | None |
| | Amount (g/m²) | 0 | 0 |
| Air bag | Touch | Very good | Very good |
| | Resistance to inflation | Perforation, damage | Nothing | None |
| | | Gas-shielding property | Very good | Very good |
| | Adhesion reinforcement | Applied or not | Applied | Applied |
| | | Points | Environs of inflator and center of top cloth | Environs of inflator and center of top cloth |
| | | Outside or inside of bag | Inside of bag | Inside of bag |
| | | Type of woven fabric | Same as bag | Same as bag |
| | | Adhesive | Polyester type copolymer nonwoven fabric | Polyester type copolymer film |
| | | Direction | Same direction | Same direction |
| | Burst strength (kg/cm²G) | 1.8 | 1.8 |
| General evaluation | | Good | Good |

In Tables 1 to 5, the following are clearly indicated.

First, in Example 1, since the physical properties of the yarns and the physical properties of the woven fabric satisfy all the requirements of the present invention, the resultant air bag has a good resistance to inflation, burst strength and touch. Also, in Example 3, good results were obtained, although the touch is relatively stiff due to a relatively large yarn thickness and individual filament thickness. In Example 3, a reduction in bonding property was feared from the fact that non-twisted warp and weft yarns were employed. However, it was found that the burst strength of the air bag was enhanced due to the fact that the individual filament thickness was large, the calendering conditions were slightly eased and the basis weight was large. In Example 4, the burst strength was satisfactory due to a large individual filament thickness, whereas the warp and weft yarns were non-twisted yarns. In Example 5, the resultant air bag exhibited good performance, while the calender treatment was applied only once. In Example 6, since the individual filament thickness was small and the warp and weft yarns were non-twisted yarns, the calendering conditions were slightly eased. Thus the resultant air bag exhibited good performance. In Example 7, a silicone rubber was coated in an amount of 5%. The resultant air bag exhibited an excellent touch and good performance. In Example 8, since the shrinkage of the yarn was large, the resultant cover factor and fiber packing were also large. However, the resultant air bag exhibited good performance. In Example 9, the yarn thickness was large and in Example 10, the individual filament thickness was certainly large. However, the resultant air bags in these examples exhibited good performance. In Example 11, since both the inside and outside surfaces of the air bag were reinforced by a reinforcing woven fabric, the resultant air bag exhibited a slightly enhanced burst strength in comparison with an air bag reinforced only in the inside surface thereof. In Example 12, a polyester type copolymer nonwoven fabric was employed as a bonding material. The resultant air bag had a good burst strength. Similarly, in Example 13, a polyester type copolymer film was used as a bonding material, and the resultant air bag had a goo burst strength.

Comparative Examples 1 to 12

In each of Comparative Examples 1 to 12, the polyester multifilament yarns having the physical properties as indicated in Tables 6 to 10 were employed to produce a high density plain weave fabric. To the woven fabric, a scouring treatment, a heat setting and a calender treatment on one or two surfaces thereof were applied. The calender treatment was carried out under the same conditions as in Examples 1 to 13. To some woven fabrics, a fray-preventing treatment with a silicone rubber was applied. A 60 liter air bag for a driver seat was formed from the woven fabric. In this forming procedure, the smoothed surface of the calendered woven fabric was arranged so as to form an outside surface of the air bag.

Some of the air bags were reinforced in the top cloth and a portion thereof surrounding the inflator, by adhering a reinforcing woven fabric thereto with an adhesive. The reinforcing woven fabric was of the same type as the woven fabric for the air bag and adhered in the same direction as the air bag-forming woven fabric. The adhesive as shown in Tables 6 to 10 was employed. The air bag was subjected to the inflation test and to the burst test. In Tables 6 to 10, the physical properties of the woven fabric and the performance of the air bag are indicated.

TABLE 6

| Item | | Example No. Comparative Example 1 | Comparative Example 2 | Comparative Example 3 |
|---|---|---|---|---|
| Properties of yarn | Yarn thickness (de) | 420 | 420 | 420 |
| | Individual filament thickness (d) | 1.7 | 1.7 | 1.7 |
| | Twist coefficient | | | |
| | warp | 3074 | 3074 | 2049 |
| | weft | 3074 | 3074 | 2049 |
| | Dry heat shrinkage (%) | 4.5 | 2.5 | 4.5 |
| | Shrinkage in boiling water (%) | 2.1 | 1.3 | 2.1 |
| Properties of woven fabric | Tensile strength (g/de) | 9.3 | 8.6 | 8.6 |
| | Ultimate elongation of yarn taken out from woven fabric (%) | 21.0 | 20.2 | 20.2 |
| | Basis weight (g/m$^2$) | 235 | 234 | 234 |
| | Thickness (mm) | 0.218 | 0.212 | 0.209 |
| | Cover factor | | | |
| | warp | 1148 | 1148 | 1148 |
| | weft | 1150 | 1066 | 1060 |
| | Tensile strength (kg/3 cm) | 246 | 241 | 241 |
| | Ultimate elongation (%) | 31.6 | 30.2 | 30.2 |
| | Calender treatment | Twice on one surface | Twice on one surface | On both surface |
| | Q(p) (ml/cm$^2$/sec) | 159.1 p | 218.7 p | 8.9 p |
| | R1 | 3.70 | 2.61 | 3.78 |
| | R2 | 0.34 | 0.50 | 0.35 |
| | R3 | 1.28 | 1.29 | 3.78 |
| | Mu − Mc | 0.012 | 0.011 | 0.0004 |
| | Su − Sc (μm) | 4.2 | 4.1 | 0.1 |
| | P (%) | 78.1 | 80.0 | 81.1 |
| Treatment by thermosetting resin | Type of resin | None | None | None |
| | Amount (g/m$^2$) | 0 | 0 | 0 |
| Air bag | Touch | Good | Good | Bad |
| | Resistance to inflation | Perforation, damage | Perforations were formed in top cloth | Perforations were formed in top cloth | Nothing |
| | | Gas-shielding property | Bad | Bad | Good |
| | Adhesion reinforcement | Applied or not | Applied | Applied | Applied |
| | | Points | Environs of inflator and center of top cloth | Environs of inflator and center of top cloth | Environs of inflator and center of top cloth |
| | | Outside or inside of bag | Inside of bag | Inside of bag | Inside of bag |
| | | Type of woven fabric | Same as bag | Same as bag | Same as bag |
| | | Adhesive | Silicone rubber | Silicone rubber | Silicone rubber |
| | | Direction | Same direction | Same direction | Same direction |
| | Burst strength (kg/cm$^2$G) | | 1.5 | 1.5 | 1.2 |
| General evaluation | | Bad | Bad | Bad |

TABLE 7

| Item | | Example No. Comparative Example 4 | Comparative Example 5 |
|---|---|---|---|
| Properties of yarn | Yarn thickness (de) | 420 | 420 |
| | Individual filament thickness (d) | 6.5 | 1.7 |
| | Twist coefficient | | |
| | warp | 4119 | 2049 |
| | weft | 4119 | 0 |
| | Dry heat shrinkage (%) | 2.5 | 4.5 |

TABLE 7-continued

| Item | | Comparative Example 4 | Comparative Example 5 |
|---|---|---|---|
| Properties of woven fabric | Shrinkage in boiling water (%) | 1.3 | 2.1 |
| | Tensile strength (g/de) | 9.3 | 9.3 |
| | Ultimate elongation of yarn taken out from woven fabric (%) | 21.0 | 21.0 |
| | Basis weight (g/m$^2$) | 235 | 210 |
| | Thickness (mm) | 0.218 | 0.207 |
| | Cover factor | | |
| | warp | 1148 | 1148 |
| | weft | 1067 | 1045 |
| | Tensile strength (kg/3 cm) | 246 | 221 |
| | Ultimate elongation (%) | 31.6 | 29.8 |
| | Calender treatment | Twice on one surface | Twice on one surface |
| | Q(p) (ml/cm$^2$/sec) | 292.3 p | 102.3 p |
| | R1 | 2.33 | 3.90 |
| | R2 | 0.33 | 0.41 |
| | R3 | 1.00 | 1.16 |
| | Mu − Mc | 0.0009 | 0.004 |
| | Su − Sc (μm) | 0.8 | 2.0 |
| | P (%) | 78.1 | 73.5 |
| Treatment by thermosetting resin | Type of resin | None | None |
| | Amount (g/m$^2$) | 0 | 0 |
| Air bag | Touch | Bad | Good |
| | Resistance to inflation — Perforation, damage | Perforations were formed in top cloth | Perforations were formed in top cloth |
| | Gas-shielding property | Bad | Bad |
| | Adhesion reinforcement — Applied or not | Applied | Applied |
| | Points | Environs of inflator and center of top cloth | Environs of inflator and center of top cloth |
| | Outside or inside of bag | Inside of bag | Inside of bag |
| | Type of woven fabric | Same as bag | Same as bag |
| | Adhesive | Silicone rubber | Silicone rubber |
| | Direction | Same direction | Same direction |
| | Burst strength (kg/cm$^2$G) | 1.3 | 1.9 |
| General evaluation | | Bad | Bad |

TABLE 8

| Item | | Comparative Example 6 | Comparative Example 7 | Comparative Example 8 |
|---|---|---|---|---|
| Properties of yarn | Yarn thickness (de) | 420 | 600 | 420 |
| | Individual filament thickness (d) | 1.7 | 6.3 | 1.7 |
| | Twist coefficient | | | |
| | warp | 2049 | 2449 | 2049 |
| | weft | 0 | 2449 | 0 |
| | Dry heat shrinkage (%) | 4.5 | 4.8 | 4.5 |
| | Shrinkage in boiling water (%) | 2.1 | 2.3 | 2.2 |
| Properties of woven fabric | Tensile strength (g/de) | 9.3 | 6.1 | 8.9 |
| | Ultimate elongation of yarn taken out from woven fabric (%) | 21.0 | 21.2 | 22.0 |
| | Basis weight (g/m$^2$) | 220 | 265 | 229 |
| | Thickness (mm) | 0.210 | 0.248 | 0.255 |
| | Cover factor | | | |
| | warp | 1701 | 1188 | 1220 |
| | weft | 676 | 1281 | 1150 |
| | Tensile strength (kg/3 cm) | 200 | 286 | 233 |
| | Ultimate elongation (%) | 28.4 | 34.6 | 31.2 |
| | Calender treatment | Twice on one surface | Twice on one surface | Once on one surface |
| | Q(p) (ml/cm$^2$/sec) | 124.9 p | 133.1 p | 341.5 p |
| | R1 | 3.80 | 4.70 | 0.52 |
| | R2 | 0.62 | 0.74 | 0.51 |
| | R3 | 1.44 | 3.33 | 1.51 |
| | Mu − Mc | 0.009 | 0.005 | 0.0006 |
| | Su − Sc (μm) | 2.8 | 5.2 | 0.6 |
| | P (%) | 75.9 | 77.4 | 65.1 |
| Treatment by thermosetting resin | Type of resin | None | None | None |
| | Amount (g/m$^2$) | 0 | 0 | 0 |
| Air bag | Touch | Good | Bad | Good |
| | Resistance to inflation — Perforation, damage | Perforations were formed in top cloth | Perforations were formed in top cloth | Perforations were formed in top cloth |
| | Gas-shielding property | Bad | Bad | Good |
| | Adhesion reinforcement — Applied or not | Applied | Applied | Applied |
| | Points | Environs of inflator and center of top cloth | Environs of inflator and center of top cloth | Environs of inflator and center of top cloth |
| | Outside or inside of bag | Inside of bag | Inside of bag | Inside of bag |
| | Type of woven fabric | Same as bag | Same as bag | Same as bag |
| | Adhesive | Silicone rubber | Silicone rubber | Silicone rubber |
| | Direction | Same direction | Same direction | Same direction |

TABLE 8-continued

| Item | Comparative Example 6 | Comparative Example 7 | Comparative Example 8 |
|---|---|---|---|
| Burst strength (kg/cm$^2$G) | 1.2 | 2.2 | 1.9 |
| General evaluation | Bad | Bad | Bad |

TABLE 9

| Item | | Comparative Example 9 | Comparative Example 10 |
|---|---|---|---|
| Properties of yarn | Yarn thickness (de) | 420 | 420 |
| | Individual filament thickness (d) | 1.7 | 1.7 |
| | Twist coefficient | | |
| | warp | 2049 | 2049 |
| | weft | 0 | 0 |
| | Dry heat shrinkage (%) | 4.5 | 4.5 |
| | Shrinkage in boiling water (%) | 2.1 | 2.1 |
| Properties of woven fabric | Tensile strength (g/de) | 8.9 | 8.9 |
| | Ultimate elongation of yarn taken out from woven fabric (%) | 22.0 | 22.0 |
| | Basis weight (g/m$^2$) | 237 | 237 |
| | Thickness (mm) | 0.219 | 0.219 |
| | Cover factor | | |
| | warp | 1189 | 1189 |
| | weft | 1227 | 1227 |
| | Tensile strength (kg/3 cm) | 236 | 236 |
| | Ultimate elongation (%) | 30.8 | 30.8 |
| | Calender treatment | Twice on one surface | Twice on one surface |
| | Q(p) (ml/cm$^2$/sec) | 24.5 p | 24.5 p |
| | R1 | 3.90 | 3.90 |
| | R2 | 0.40 | 0.40 |
| | R3 | 1.15 | 1.15 |
| | Mu − Mc | 0.005 | 0.005 |
| | Su − Sc (μm) | 2.1 | 2.1 |
| | P (%) | 78.4 | 78.4 |
| Treatment by thermosetting resin | Type of resin | Silicone rubber | None |
| | Amount (g/m$^2$) | 25 | 0 |
| Air bag | Touch | Bad | Good |
| | Resistance to inflation | Perforation, damage | Nothing | Nothing |
| | | Gas-shielding property | Good | Good |
| | Adhesion reinforcement | Applied or not | Applied | Not applied |
| | | Points | Environs of inflator and center of top cloth | |
| | | Outside or inside of bag | Inside of bag | |
| | | Type of woven fabric | Same as bag | |
| | | Adhesive | Silicone rubber | |
| | | Direction | Same direction | |
| | Burst strength (kg/cm$^2$G) | 1.9 | 1.0 |
| | General evaluation | Good | Good |

TABLE 10

| Item | | Comparative Example 11 | Comparative Example 12 |
|---|---|---|---|
| Properties of yarn | Yarn thickness (de) | 420 | 420 |
| | Individual filament thickness (d) | 1.7 | 1.7 |
| | Twist coefficient | | |
| | warp | 2049 | 2049 |
| | weft | 0 | 0 |
| | Dry heat shrinkage (%) | 4.5 | 4.5 |
| | Shrinkage in boiling water (%) | 2.1 | 2.1 |
| Properties of woven fabric | Tensile strength (g/de) | 8.9 | 8.9 |
| | Ultimate elongation of yarn taken out from woven fabric (%) | 22.0 | 22.0 |
| | Basis weight (g/m$^2$) | 237 | 237 |
| | Thickness (mm) | 0.218 | 0.218 |
| | Cover factor | | |
| | warp | 1189 | 1189 |
| | weft | 1227 | 1227 |
| | Tensile strength (kg/3 cm) | 236 | 236 |
| | Ultimate elongation (%) | 30.8 | 30.8 |
| | Calender treatment | Twice on one surface | Twice on one surface |
| | Q(p) (ml/cm$^2$/sec) | 24.5 p | 24.5 p |
| | R1 | 3.90 | 3.90 |
| | R2 | 0.40 | 0.40 |
| | R3 | 1.15 | 1.15 |
| | Mu − Mc | 0.005 | 0.005 |
| | Su − Sc (μm) | 2.1 | 2.1 |
| | P (%) | 28.4 | 78.4 |
| Treatment by thermosetting resin | Type of resin | None | None |
| | Amount (g/m$^2$) | 0 | 0 |
| Air bag | Touch | Good | Good |
| | Resistance to inflation | Perforation, damage | Nothing | None |
| | | Gas-shielding property | Good | Good |
| | Adhesion reinforcement | Applied or not | Applied | Applied |
| | | Points | Environs of inflator and center of top cloth | Environs of inflator and center of top cloth |
| | | Outside or inside of bag | Outside of bag | Inside of bag |
| | | Type of woven fabric | Same as bag | Same as bag |
| | | Adhesive | Silicone rubber | Nylon type copolymer nonwoven fabric |
| | | Direction | Same direction | Same direction |
| | Burst strength (kg/cm$^2$G) | 1.2 | 1.1 |
| | General evaluation | Bad | Bad |

From Tables 6 to 10, the following facts were made clear.

First, in Comparative Example 1, the twist coefficients of warps and wefts were large and thus the gas permeability function was large. Therefore, when inflated, gas-permeable perforations were formed in the top cloth of the air bag. Also, the burst strength was not satisfactorily enhanced. In Comparative Example 2, since the twist multiplier of the yarns was large and the shrinkage of the yarns was small, the gas permeability function was further increased. Thus, when inflated, gas-permeable perforations were formed in the top cloth and the burst strength was low. In Comparative Example 3, the calender treatment was applied to both surfaces of the woven fabric, the values of R1 and R3 became the same as each other, and the value of (Mu−Mc) and the value of (Su−Sc) became smaller. Thus the touch of the woven fabric was bad, the adhesion reinforcement effect was poor and the burst strength was lowered. In Comparative Example 4, since both the warps and wefts had a large twist multiplier and a low shrinkage, the gas-permeability function became large. Thus, when inflated, gas-permeable perforations were formed in the top cloth, and the burst strength was unsatisfactory even when the adhesion reinforcement was applied. In Comparative Example 5, since the cover factor of the woven fabric in the weft direction was small, gas-permeable perforations were formed in the top cloth when inflated. In Comparative Example 6, since the cover factor of the woven fabric was extremely large in the warp direction and extremely small in the weft direction, gas-permeable perforations were formed in the top cloth when inflated, and the burst strength was decreased. In Comparative Example 7, since the yarn thickness was large, the effect of the calender treatment was unsatisfactory, the gas-permeability function became large and gas-permeable perforations were formed when inflated. In Comparative Example 8, since the calender treatment results were insufficient, the fiber packing was small, the gas permeability function became extremely large, and thus gas permeable perforations were formed in the top cloth and the bottom cloth. In Comparative Example 9, since the silicone rubber was coated in a large amount of 25%, the resultant touch was bad. In Comparative Example 10, since no adhesion reinforcement was applied, the burst strength was insufficient. In Comparative Example 11, since the adhesion reinforcement was applied to a smoothed outside surface of the air bag, the burst strength became insufficient. In comparative example 12, since a nylon type copolymer nonwoven fabric was used as a bonding material, the bonding force was insufficient and thus the burst strength was low.

Comparative Examples 13 and 14

In Example 1 of the specification of U.S. Pat. No. 4,977,016, a base fabric for an air bag, calendered on only one surface thereof is described as a comparative example. In this comparative example, the warp yarns were of 440 deniers/100 filaments (the number of twist: 31/4 turns/inch=130 turns/m) and weft yarns were of 440 deniers/100 filaments (the number of twist: 0). From those warp and weft yarns, a 2×2 check-patterned woven fabric was produced. The woven fabric was calendered under conditions of 70 psi and 360° F., to produce a base fabric having a gas permeability of 1.82 CFM (after one calender treatment) and of 1.42 CFM (after two calender treatments).

In view of this, in Comparative Examples 13 and 14, a woven fabric was produced from polyester multifilament warp and weft yarns having the same yarn counts as mentioned above, respectively, by applying the same calender treatment as mentioned above. The resultant woven fabric had a gas permeability of 1.82 CFM (in Comparative Example 13) and of 1.42 CFM (in Comparative Example 14). The physical properties of the woven fabrics are shown in Table 11.

TABLE 11

| Item | | | Comparative Example 13 | Comparative Example 14 |
|---|---|---|---|---|
| Properties of yarn | Yarn thickness (de) | | 440 | 440 |
| | Individual filament thickness (d) | | 4.4 | 4.4 |
| | Twist coefficient | | | |
| | warp | | 2726 | 2726 |
| | weft | | 0 | 0 |
| | Dry heat shrinkage (%) | | 4.3 | 4.3 |
| | Shrinkage in boiling water (%) | | 2.5 | 2.5 |
| Properties of woven fabric | Tensile strength (g/de) | | 8.9 | 8.9 |
| | Ultimate elongation of yarn taken out from woven fabric (%) | | 21.5 | 21.5 |
| | Basis weight (g/m$^2$) | | 222 | 224 |
| | Thickness (mm) | | 0.275 | 0.260 |
| | Cover factor | | | |
| | warp | | 1130 | 1133 |
| | weft | | 1063 | 1071 |
| | Tensile strength (kg/3 cm) | | 231 | 230 |
| | Ultimate elongation (%) | | 33.1 | 32.2 |
| | Calender treatment | | Once on one surface | Twice on one surface |
| | Q(p) (ml/cm$^2$/sec) | | 728 p | 559 p |
| | R1 | | 0.41 | 0.43 |
| | R2 | | 0.38 | 0.41 |
| | R3 | | 0.37 | 1.40 |
| | Mu − Mc | | 0.0009 | 0.0011 |
| | Su − Sc (μm) | | 0.3 | 0.4 |
| | P (%) | | 58.5 | 62.4 |
| Treatment by thermosetting resin | Type of resin | | None | None |
| | Amount (g/m$^2$) | | 0 | 0 |
| Air bag | Touch | | Good | Good |
| | Resistance to inflation | Perforation, damage | Perforations were formed in top and bottom clothes | Perforations were formed in top and bottom clothes |
| | | Gas-shielding property | Bad | Bad |
| | Adhesion reinforcement | Applied or not | Applied | Applied |
| | | Point | Environs of inflator and center of top cloth | Environs of inflator and center of top cloth |
| | | Outside or inside of bag | Inside of bag | Inside of bag |
| | | Type of woven fabric | Same as bag | Same as bag |
| | | Adhesive | Silicone rubber | Silicone rubber |
| | | Direction | Same direction | Same direction |
| Burst strength (kg/cm$^2$G) | | | 1.5 | 1.5 |
| General evaluation | | | Bad | Bad |

As indicated in Table 11, in the woven fabrics of Comparative Examples 13 and 14, it is understood that since the calender treatment was carried out under a low pressure of 70 psi (which corresponded to 65 to 80 ton/70 inches width and to a linear pressure of 365 to 450 kg/cm in accordance with the description of the U.S. patent specification), a satisfactory one surface-smoothed structure was not obtained even when the calender treatment was applied twice to one surface of the woven fabric. Namely, the gas permeability function Q(p) became extremely large and was not located in the region between F(p) and G(p). Also, R3 was less than 0.5 and the resultant woven fabric exhibited a lowered airtightnes. Also, since the difference in surface structure between the two surfaces is small, the Su−Sc value became small, namely less than 0.5. Further, the fiber packing became less than 70%. From these results, when inflated, the high temperature gas was flowed out in an extremely large amount through the woven fabric, and gas-permeable perforations were formed in the top and bottom cloths. Furthermore, since the twist multiplier was large, the burst strength was unsatisfactory even when an adhesion reinforcement was applied. Accordingly, it is clear that these woven fabrics were not suitable for forming the air bag.

Industrial Applicability

The airtight woven fabric sheet for an air bag of the present invention is advantageous in that, in spite of the fact that the woven fabric was calender-treated on only one surface thereof and not both the surfaces thereof as in a conventional both surface-calendered fabric, when inflated, since no gas-permeable perforations are formed in the air bag due to a very low gas-permeability.

There is no risk of being burnt by the inflation gas leaking through the perforations, and the resultant air bag provides a higher degree of safety, and since the opposite surface of the woven fabric is not smoothed, the resultant woven fabric has a good touch and can be adhesion-reinforced by utilizing the non-smoothed surface. Therefore, the woven fabric is useful for providing a non-coated air bag having a high inflation resistance and a high burst strength.

We claim:

1. A gastight woven fabric sheet for air bags, comprising a woven fabric formed from a plurality of warp and wefts each comprising a polyester multifilament yarn having a yarn thickness of 200 to 550 deniers and a twist multiplier of 3,000 or less, said woven fabric having a smoothed surface and an opposite non-smoothed surface thereof, and satisfying all the relationships (1) to (7):

$$78.74p \geq Q(p) \geq 7.874p \quad (1)$$

$$R1 > R2 \quad (2)$$

$$R1 > R3 \quad (3)$$

$$3.5 \geq R3 \geq 0.5 \quad (4)$$

$$Mu - Mc \geq 0.0005 \quad (5)$$

$$Su - Sc \geq 0.5 \quad (6)$$

and $$85 \geq P \geq 70 \quad (7)$$

in which relationships (1) to (7), p represents a pressure in unit of $kg/cm^2 G$ and satisfying the relationship:

$$0 \leq p \leq 0.03;$$

Q(p) represents a gas permeability function in units of $ml/cm^2/sec$ of the woven fabric under the pressure p;

R1 represents a radius of curvature in units of mm of a smoothed surface side half portion of a cross-sectional profile of at least one selected from the warp and weft yarns located in the smoothed surface portions of the woven fabric;

R2 represents a radius of curvature in units of mm of an opposite side half portion of the cross-sectional profile of the at least one selected from the warp and weft yarns located in the smoothed surface portion of the woven fabric;

R3 represents a radius of curvature in units of mm of a non-smoothed surface side half portion of a cross-sectional profile of at least one selected from the warp and weft yarns located in the non-smoothed surface portion of the woven fabric;

Mc represents an average deviation in surface frictional coefficient of the smoothed surface of the woven fabric;

Mu represents an average deviation in surface frictional coefficient of the non-smoothed surface of the woven fabric;

Sc represents an average deviation in surface roughness in units of $\mu m$ of the smoothed surface of the woven fabric;

Su represents an average deviation in surface roughness in units of $\mu m$ of the non-smoothed surface of the woven fabric; and P represents a fiber packing in units of % of the woven fabric.

2. The gastight woven fabric sheet for air bag as claimed in claim 1, wherein each of the polyester multifilament warp and weft yarns has a twist multiplier of 2,500 or less.

3. The gastight woven fabric sheet for air bag as claimed in claim 1, wherein the woven fabric has a cover factor of 1,050 to 1,300 in each of warp and weft directions of the woven fabric.

4. The gastight woven fabric sheet for air bag as claimed in claim 1, wherein each of the polyester multifilament warp and weft yarns has an individual filament thickness of 2.8 deniers or less.

5. The gastight woven fabric sheet for air bag as claimed in claim 1, wherein the woven fabric has a tensile strength of 180 kg/3 cm or more and an ultimate elongation of 25% or more in each of the warp and weft directions of the woven fabric.

6. The gastight woven fabric sheet for air bag as claimed in claim 1, wherein the polyester multifilament warp and weft yarns have a tensile strength of 8.0 g/d or more and an ultimate elongation of 18% or more.

7. The gastight woven fabric sheet for air bag as claimed in claim 1, wherein the woven fabric is coated by or impregnated with a thermosetting resin in an amount of 1 to 20 $g/m^2$.

8. The gastight woven fabric sheet for air bag as claimed in claim 7, wherein the thermosetting resin is selected from addition reaction type silicone rubbers.

9. An air bag formed from the gastight woven fabric sheet as claimed in claim 1, wherein the outside surface of the air bag is formed by the smoothed surface of the woven fabric sheet and the inside surface of the air bag is formed by the non-smoothed surface of the woven fabric sheet.

10. The air bag as claimed in claim 9, which is provided with an inflator and a topcloth, a portion of the inside surface portion of the air bag around the inflator and/or the topcloth being adhesion-reinforced.

11. A process for producing a gastight woven fabric sheet for air bag as claimed in claim 1, comprising the steps of:

producing a woven fabric from a plurality of warp and weft yarns each comprising polyester multifilaments and each having a yarn thickness of 200 to 550 deniers and a twist multiplier of 3,000 or less, the woven fabric having a cover factor of 1,050 to 1,300 in each of the warp and weft directions thereof; and calendering the woven fabric in such a manner that only one surface of the woven fabric is smoothed by using a calendering metal roll with a surface temperature of 150° to 220° C. under a linear pressure of 500 kg/cm² or more at a calendering velocity of 1 to 50 m/min.

12. The process for producing the gastight woven fabric sheet for air bag as claimed in claim 11, which further comprises a step of coating or impregnating the calendered woven fabric with a thermosetting resin in an amount of from 1 to 20 g/m².

13. The process for producing the gastight woven fabric sheet for air bag as claimed in claim 11, wherein each of the polyester multifilament warp and weft yarns has a twist multiplier of 2,500 or less.

14. The process for producing the gastight woven fabric sheet for air bags as claimed in claim 11, wherein the polyester multifilament warp and weft yarns have dry heat shrinkages of 3 to 8% at a temperature of 150° C. and of 1.5 to 5% at a temperature of 100° C.

15. The process for producing the gastight woven fabric sheet for air bags as claimed in claim 11, wherein the polyester multifilament yarn has an individual filament thickness of 2.5 deniers or less.

16. The process for producing the gastight woven fabric sheet for air bag as claimed in claim 11, wherein the polyester multifilament yarns have a tensile strength of 9.0 g/d or more and an ultimate elongation of 10% or more.

17. The process for producing the gastight woven fabric sheet for air bag as claimed in claim 12, wherein the thermosetting resin is selected from addition reaction type silicone rubbers.

* * * * *